United States Patent
Nishi et al.

(10) Patent No.: US 11,282,223 B2
(45) Date of Patent: Mar. 22, 2022

(54) SIGNAL PROCESSING APPARATUS, SIGNAL PROCESSING METHOD, AND IMAGING APPARATUS

(71) Applicant: SONY CORPORATION, Tokyo (JP)

(72) Inventors: Tomohiro Nishi, Tokyo (JP); Hideyuki Ichihashi, Tokyo (JP); Yiwen Zhu, Kanagawa (JP); Masatoshi Yokokawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 17/046,386

(22) PCT Filed: Jan. 30, 2019

(86) PCT No.: PCT/JP2019/003155
§ 371 (c)(1),
(2) Date: Oct. 9, 2020

(87) PCT Pub. No.: WO2019/202809
PCT Pub. Date: Oct. 24, 2019

(65) Prior Publication Data
US 2021/0174527 A1    Jun. 10, 2021

(30) Foreign Application Priority Data

Apr. 17, 2018 (JP) .............................. JP2018-079399

(51) Int. Cl.
*G06T 7/579* (2017.01)
*G06T 7/70* (2017.01)
(Continued)

(52) U.S. Cl.
CPC ................ *G06T 7/579* (2017.01); *G06T 7/20* (2013.01); *G06T 7/70* (2017.01); *H04N 5/247* (2013.01);
(Continued)

(58) Field of Classification Search
None
See application file for complete search history.

(56) References Cited

U.S. PATENT DOCUMENTS

| 2011/0110583 A1* | 5/2011 | Zhang | G06T 7/579 |
| | | | 382/154 |
| 2015/0288953 A1* | 10/2015 | Kakegawa | G06T 7/97 |
| | | | 348/43 |
| 2016/0232654 A1* | 8/2016 | Suzuki | B25J 9/1697 |

FOREIGN PATENT DOCUMENTS

| EP | 2300987 A1 | 3/2011 |
| EP | 2910897 A1 | 8/2015 |

(Continued)

OTHER PUBLICATIONS

International Search Report and Written Opinion of PCT Application No. PCT/JP2019/003155, dated May 7, 2019, 09 pages of ISRWO.

*Primary Examiner* — James M Anderson, II
(74) *Attorney, Agent, or Firm* — Chip Law Group

(57) ABSTRACT

Provided are a signal processing apparatus, a signal processing method, and an imaging apparatus for estimating depth with a high degree of accuracy from video signals of a plurality of cameras. The signal processing apparatus includes a detection unit that detects depth from video captured by a plurality of cameras, an estimation unit that estimates camera motion by detecting a camera position, a prediction unit that predicts present depth from camera motion and depth obtained previously, and a synthesis unit that synthesizes depth detected by the detection unit and depth predicted by the prediction unit on the basis of a result of estimating the amount of blur that occurs in each image captured by cameras. The amount of blur can be estimated using camera motion, previous depth information, and shutter time.

13 Claims, 9 Drawing Sheets

(51) Int. Cl.
*G06T 7/20* (2017.01)
*H04N 5/247* (2006.01)
*H04N 5/232* (2006.01)

(52) U.S. Cl.
CPC ............ *G06T 2207/10016* (2013.01); *G06T 2207/30244* (2013.01); *H04N 5/23258* (2013.01)

(56) References Cited

FOREIGN PATENT DOCUMENTS

| | | |
|---|---|---|
| JP | 2011-525657 A | 9/2011 |
| JP | 2014-085120 A | 5/2014 |
| JP | 2014-238409 A | 12/2014 |
| JP | 2015-206798 A | 11/2015 |
| JP | 2016-148649 A | 8/2016 |
| WO | 2009/157895 A1 | 12/2009 |

\* cited by examiner

SIGNAL PROCESSING APPARATUS, SIGNAL PROCESSING METHOD, AND IMAGING APPARATUS

CROSS REFERENCE TO RELATED APPLICATIONS

This application is a U.S. National Phase of International Patent Application No. PCT/JP2019/003155 filed on Jan. 30, 2019, which claims priority benefit of Japanese Patent Application No. JP 2018-079399 filed in the Japan Patent Office on Apr. 17, 2018. Each of the above-referenced applications is hereby incorporated herein by reference in its entirety.

TECHNICAL FIELD

The technology disclosed herein relates to a signal processing apparatus, a signal processing method, and an imaging apparatus for processing a video signal of a camera.

BACKGROUND ART

A technique for estimating subject depth information using a multi-lens camera or the like is already widely known. For example, a stereo image processing device has been proposed in which present parallax data is predicted on the basis of past parallax data and a moving speed of a pair of imaging units, and parallax is calculated for the same object on the basis of the degree of similarity obtained for each parallax and a predicted value of parallax (for example, see Patent Document 1).

A blur occurs when a camera moves due to camera shake or the like. It is difficult to find corresponding points between blurred frames, and thus the accuracy of depth estimation deteriorates, which is a problem.

CITATION LIST

Patent Document

Patent Document 1: Japanese Patent Application Laid-Open No. 2014-85120

SUMMARY OF THE INVENTION

Problems to be Solved by the Invention

An object of the technology disclosed herein is to provide a signal processing apparatus, a signal processing method, and an imaging apparatus for estimating depth with a high degree of accuracy from video signals of a plurality of cameras.

Solutions to Problems

The technology disclosed herein has been made in consideration of the problem described above, and a first aspect thereof is a signal processing apparatus including:
a detection unit that detects depth from video captured by a plurality of cameras;
an estimation unit that estimates camera motion by detecting a camera position;
a prediction unit that predicts present depth from camera motion and depth obtained previously; and
a synthesis unit that synthesizes depth detected by the detection unit and depth predicted by the prediction unit on the basis of a result of estimating the amount of blur that occurs in each image captured by cameras from camera motion.

The estimation unit may estimate motion of the plurality of cameras in a baseline direction, and the synthesis unit may perform the synthesis on the basis of a result of estimating the amount of blur that occurs in a direction vertical to a baseline.

The estimation unit may select cameras with less motion blur or cameras with similar motion blur from three or more cameras, and the detection unit may detect depth using images captured by the cameras selected by the estimation unit.

Furthermore, a second aspect of the technology disclosed herein is a signal processing method including:
a detection step of detecting depth from video captured by a plurality of cameras;
an estimation step of estimating camera motion by detecting a camera position;
a prediction step of predicting present depth from camera motion and depth obtained previously; and
a synthesis step of synthesizing depth detected in the detection step and depth predicted by the prediction unit on the basis of a result of estimating the amount of blur that occurs in each image captured by cameras from camera motion.

Furthermore, a third aspect of the technology disclosed herein is an imaging apparatus including:
a plurality of cameras;
a detection unit that detects depth from video captured by the plurality of cameras;
an estimation unit that estimates camera motion by detecting a camera position;
a prediction unit that predicts present depth from camera motion and depth obtained previously; and
a synthesis unit that synthesizes depth detected by the detection unit and depth predicted by the prediction unit on the basis of a result of estimating the amount of blur that occurs in each image captured by cameras from camera motion.

Effects of the Invention

According to the technology disclosed herein, it is possible to provide a signal processing apparatus, a signal processing method, and an imaging apparatus capable of estimating depth from video signals of a plurality of cameras with a high degree of accuracy even when the cameras move due to camera shake or the like.

Note that the effects described herein are merely examples, and the effects of the present invention are not limited thereto. Furthermore, besides the effects described above, the present invention may further exert additional effects.

Still other objects, features and advantages of the technology disclosed herein will become apparent from a more detailed description based on embodiments to be described later and accompanying drawings.

MODE FOR CARRYING OUT THE INVENTION

Hereinafter, embodiments of the technology disclosed herein will be described in detail with reference to the drawings.

EXAMPLE 1

Figure 1:
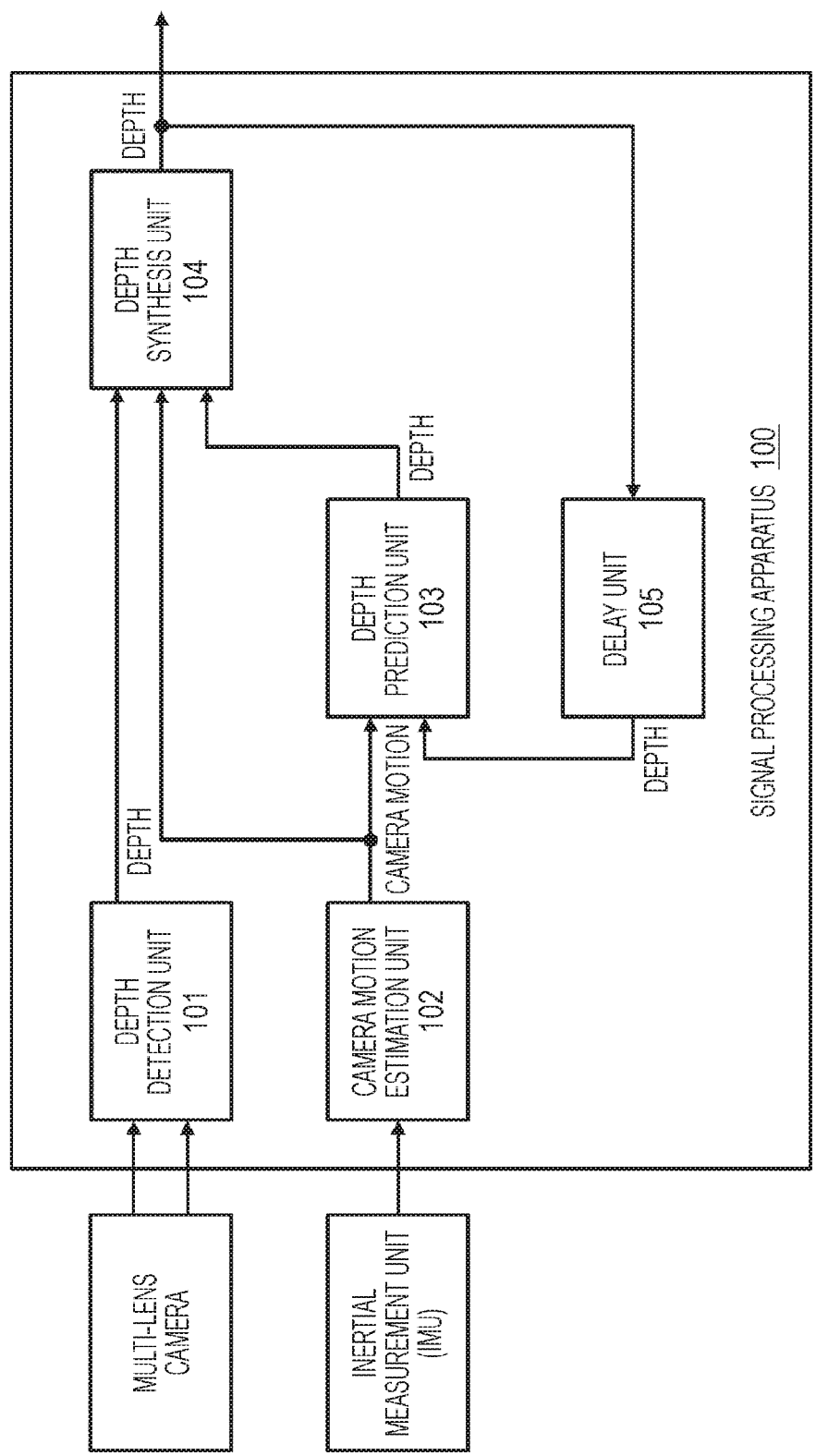
FIG. 1 is a diagram illustrating an example configuration of a signal processing apparatus 100.

FIG. 1 schematically illustrates an example configuration of a signal processing apparatus 100 to which the technology disclosed herein is applied. The illustrated signal processing apparatus 100 includes a depth detection unit 101, a camera motion estimation unit 102, a depth prediction unit 103, a depth synthesis unit 104, and a delay unit 105.

The depth detection unit 101 detects depth from video captured by a plurality of cameras (multi-lens cameras). Furthermore, the camera motion estimation unit 102 estimates camera motion by detecting a camera position.

The depth prediction unit 103 predicts depth at a current time point on the basis of the camera motion estimated by the camera motion estimation unit 102 and depth obtained previously (for example, in a preceding frame). The depth obtained previously is, specifically, depth output from the signal processing apparatus 100 in the preceding frame. Consequently, the delay unit 105 temporarily stores the depth output from the signal processing apparatus 100, and outputs the depth to the depth prediction unit 103 in a succeeding frame.

The synthesis unit 104 synthesizes depth at the current time point detected by the depth detection unit 101 from video captured by a plurality of cameras and the depth obtained by the depth prediction unit 103 from the camera motion and the depth obtained previously, and outputs more accurate depth. For example, when a camera is moving due to camera shake or the like, a blur occurs in an image captured by the camera, and thus reliability of the depth at the current time point detected by the depth detection unit 101 decreases. Therefore, the synthesis unit 104 estimates the amount of blur which occurs in each image captured by the cameras from the camera motion estimated by the camera motion estimation unit 102, and synthesizes the depth at the current time point detected by the depth detection unit 101 and depth obtained from the depth obtained by the depth prediction unit 103.

Note that the synthesis unit 104 may obtain the amount of blur in a baseline direction between cameras for which parallax is obtained as the amount of blur which occurs in images captured by the cameras (described later). Furthermore, when the signal processing apparatus 100 detects depth from video captured by three or more cameras, the depth may be obtained by selecting cameras with a less amount of blur or cameras moving similarly to each other on the basis of motion of each camera estimated by the camera motion estimation unit 102 (described later).

Here, the camera motion estimation unit 102 may estimate camera motion using any method. For example, camera motion may be estimated using an inertial measurement unit (IMU). The IMU can measure a three-dimensional angular velocity and acceleration with a three-axis gyroscope and a three-direction accelerometer. A geomagnetic sensor or a global positioning system (GPS) is also mounted on some IMUs. Integration of the three-dimensional angular velocity and acceleration output from the IMU makes it possible to acquire information regarding position and orientation, and to estimate the camera motion on the basis of a time difference thereof. Alternatively, the camera motion estimation unit 102 may estimate, from video captured by a target camera, the position of the camera using technology such as visual simultaneous localization and mapping (SLAM) to estimate the camera motion on the basis of a time difference thereof.

Furthermore, the depth detection unit 101 may detect depth using any method. For example, the depth detection unit 101 detects corresponding points by performing block matching for detecting a region with a high degree of similarity to a reference block set to one of stereo images, the detection of the region being performed in a search range set to the other thereof, and on the basis of the principle of triangulation, the depth detection unit 101 can generate, from the parallax between the corresponding points, position information including a distance to an object from each camera.

Furthermore, the depth prediction unit 103 may predict depth using any method. In the example illustrated in FIG. 1, the depth prediction unit 103 reconstitutes depth information associated with the position and orientation of a camera of the current frame from information regarding the depth of the preceding frame, information regarding the position and orientation of the camera of the preceding frame, and information regarding the position and orientation of the camera of the current frame. For example, the depth prediction unit 103 may perform a viewing transformation on the previous depth (depth of the preceding frame) to create a depth image from a new camera position.

Furthermore, the synthesis unit 104 estimates the amount of blur which occurs in each image captured by cameras from camera motion, and obtains the degree of reliability of the depth detected by the depth detection unit 101 from images captured by the cameras at a current time point. Here, it is possible to estimate the amount of blur actually included in each captured image by using the camera motion, previous depth information, and information such as shutter time. The shorter a distance from a camera to an object, the greater the amount of blur due to camera shake or the like. Accordingly, the synthesis unit 104 can estimate the amount of blur on the basis of the camera motion input from the camera motion estimation unit 102 and the depth detected by the depth detection unit 101. Alternatively, because the blur is more likely to occur as the shutter time is longer, the synthesis unit 104 may acquire an exposure condition such as shutter time from the cameras to estimate the amount of blur.

Then, the synthesis unit 104 determines a ratio α to be used for synthesizing the depth detected by the depth detection unit 101 and the depth predicted by the depth prediction unit 103 depending on the degree of reliability estimated on the basis of the amount of blur or the like, and outputs depth resulting from the synthesis thereof. When the amount of blur or the like is small and the degree of reliability of the depth detected by the depth detection unit 101 is high, a value of the ratio α for synthesizing the depth predicted by the depth prediction unit 103 is reduced. On the contrary, when the amount of blur or the like is large and the degree of reliability of the depth detected by the depth detection unit 101 is low, the value of a is increased to ensure the accuracy.

Note that the synthesis unit 104 may alternatively output only one depth of which reliability is higher, instead of synthesizing the two depths as described above. Furthermore, the depth may be selected on a pixel basis, a region basis, or a subject basis, instead of a frame basis.

Figure 2:
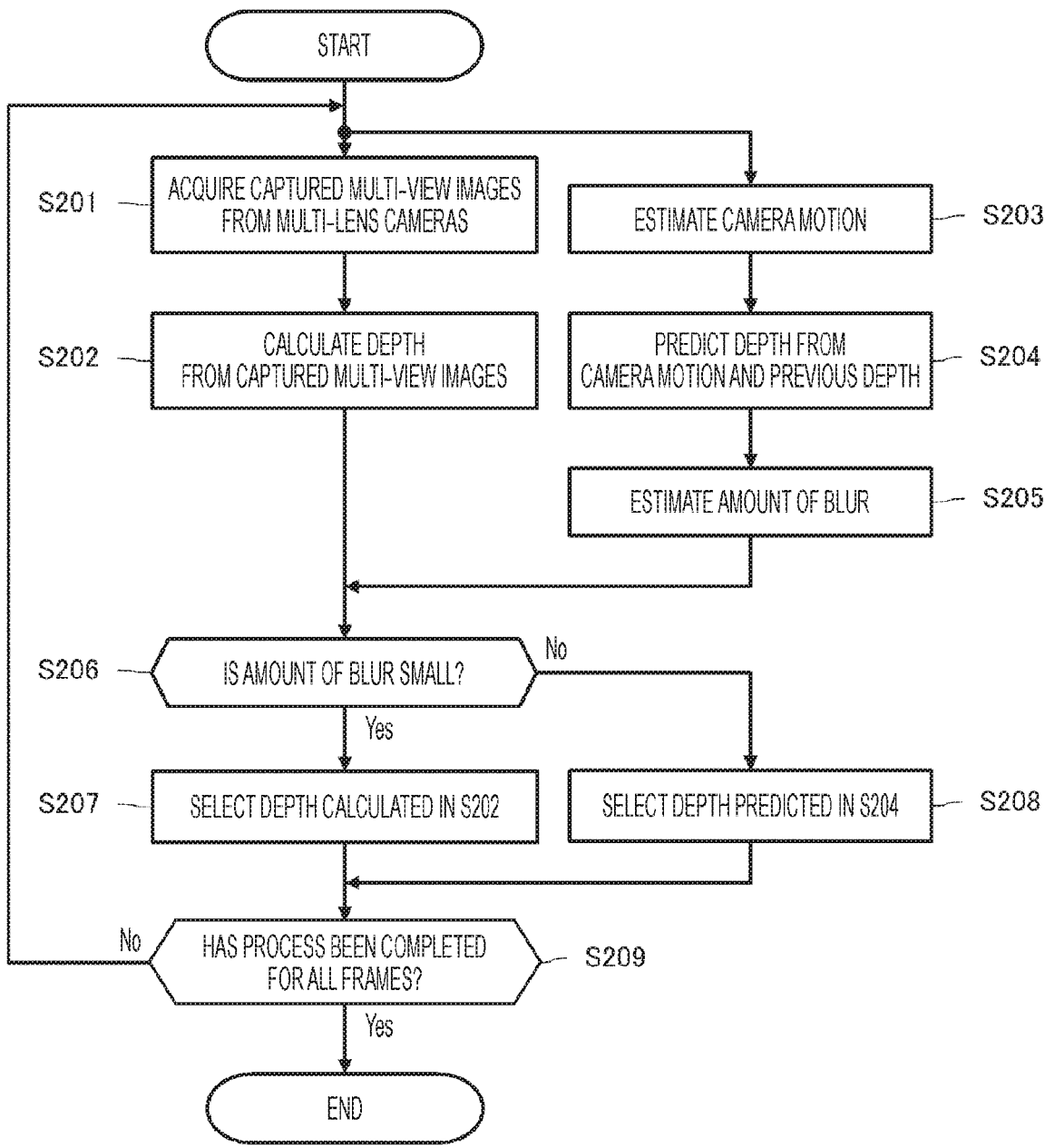
FIG. 2 is a flowchart illustrating a processing procedure for estimating depth from images captured by multi-lens cameras.

FIG. 2 illustrates, as a flowchart, a processing procedure for estimating depth from images captured by multi-lens cameras in the signal processing apparatus 100 illustrated in FIG. 1.

The depth detection unit 101 acquires captured multi-view images captured by a plurality of cameras (step S201), and calculates depth from the captured multi-view images (step S202).

Furthermore, the camera motion estimation unit 102 estimates camera motion on the basis of, for example, a three-dimensional angular velocity and acceleration acquired from an IMU (step S203). Then, the depth prediction unit 103 predicts depth at a current time point on the basis of the camera motion estimated by the camera motion estimation unit 102 and depth obtained previously (for example, in the preceding frame) (step S204).

Furthermore, the synthesis unit 104 estimates the amount of blur which occurs in each image captured by the cameras from the camera motion estimated by the camera motion estimation unit 102 (step S205). In step S205, the amount of blur may be estimated by further considering previous depth information and information such as shutter time.

Then, the synthesis unit 104 checks whether or not the estimated amount of blur is small (or is less than or equal to a predetermined threshold (step S206).

Here, if the amount of blur is small (Yes in step S206), the synthesis unit 104 selects information regarding the present depth detected by the depth detection unit 101 in previous step S202 (step S207). Alternatively, in step S207, the synthesis unit 104 may increase the ratio of the present depth information to synthesize the present depth information and the predicted depth information.

Furthermore, if the amount of blur is large (No in step S206), the synthesis unit 104 selects information regarding the depth predicted in previous step S204 by the depth prediction unit 103 on the basis of the camera motion estimated by the camera motion estimation unit 102 and the depth obtained previously (step S208). Alternatively, in step S208, the synthesis unit 104 may increase the ratio of the information regarding the depth predicted by the depth prediction unit 103 to synthesize the predicted depth information and the present depth information.

Then, if the depth estimation process described above has been completed for all frames captured by the multi-lens cameras (Yes in step S209), the process is ended.

EXAMPLE 2

In a second example, the signal processing apparatus 100 illustrated in FIG. 1 performs a depth estimation process in consideration of motion in the baseline direction between two or more cameras (multi-lens cameras).

Figure 3:
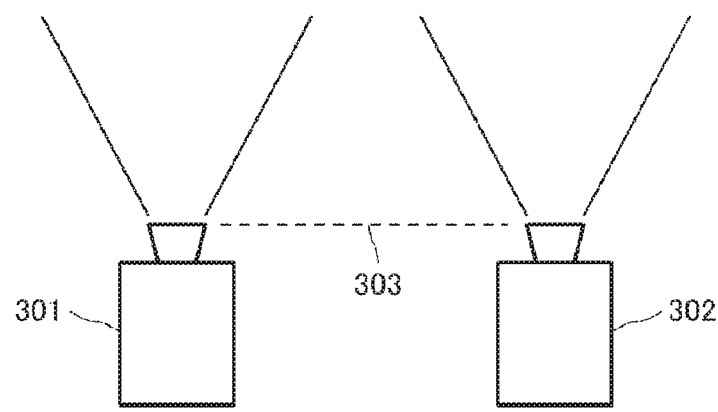
FIG. 3 is a diagram for explaining parallax between cameras.
Figure 3:
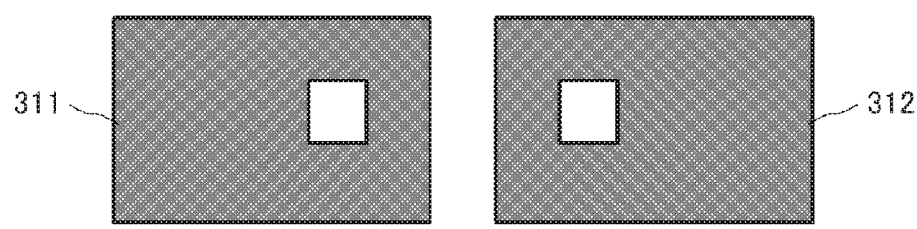

A line which connects optical axes of two cameras is called a "baseline." As illustrated in FIG. 3, a baseline 303 when cameras 301 and 302 are arranged side by side extends in a horizontal direction, and the parallax exists in the baseline direction of the cameras. Furthermore, in the figure, reference numerals 311 and 312 represent images captured by the cameras 301 and 302, respectively. In order to obtain the parallax in a horizontal direction (that is, the baseline direction) between the captured images 311 and 312, information regarding edges in a vertical direction (that is, a direction vertical to the baseline) is important. If the edges in the vertical direction of the captured images 311 and 312 are blurred, it becomes difficult to calculate the parallax, that is, depth.

Figure 4:
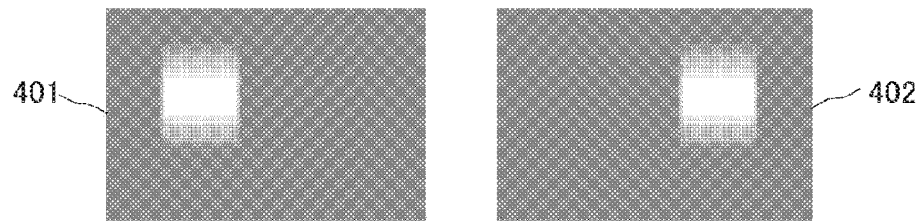
FIG. 4 is a figure exemplifying captured images when the cameras move to intersect vertically to a baseline direction.

FIG. 4 exemplifies captured images 401 and 402 captured by the cameras 301 and 302, respectively, when the cameras move to intersect vertically to the baseline direction. When the cameras move vertically to the baseline direction, the information regarding the edges in the vertical direction (that is, the direction vertical to the baseline) is stored, so that parallax between the cameras is easily obtained, and the accuracy of depth calculation does not decrease.

Figure 5:
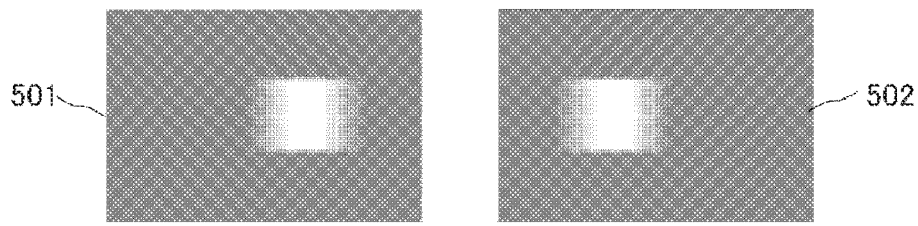
FIG. 5 is a figure exemplifying captured images when the cameras move in the same direction as the baseline direction.

Furthermore, FIG. 5 exemplifies captured images 501 and 502 captured by the cameras 301 and 302, respectively, when the cameras move in the same direction as the baseline direction. When the cameras move in the same direction as the baseline direction, information regarding edges in the horizontal direction is stored, but the information regarding the edges in the vertical direction (that is, the direction vertical to the baseline) is not stored, and therefore, it becomes difficult to obtain parallax between the cameras and the accuracy of depth calculation decreases.

Therefore, in the second example, the camera motion estimation unit 102 estimates how the cameras are moving with respect to the baseline direction between the cameras, and on the basis of the camera motion with respect to the baseline direction between the cameras, the synthesis unit 104 determines the ratio for synthesizing the information regarding the present depth detected by the depth detection unit 101 and the information regarding the depth predicted by the depth prediction unit 103 from the previous depth information, or determines which depth information to select. In the case of the captured images illustrated in FIG. 4, it is only required to select the information regarding the present depth detected by the depth detection unit 101. On the other hand, in the case of the captured images illustrated in FIG. 5, it is preferable to select the information regarding the depth predicted by the depth prediction unit 103 from the previous depth information.

Figure 6:
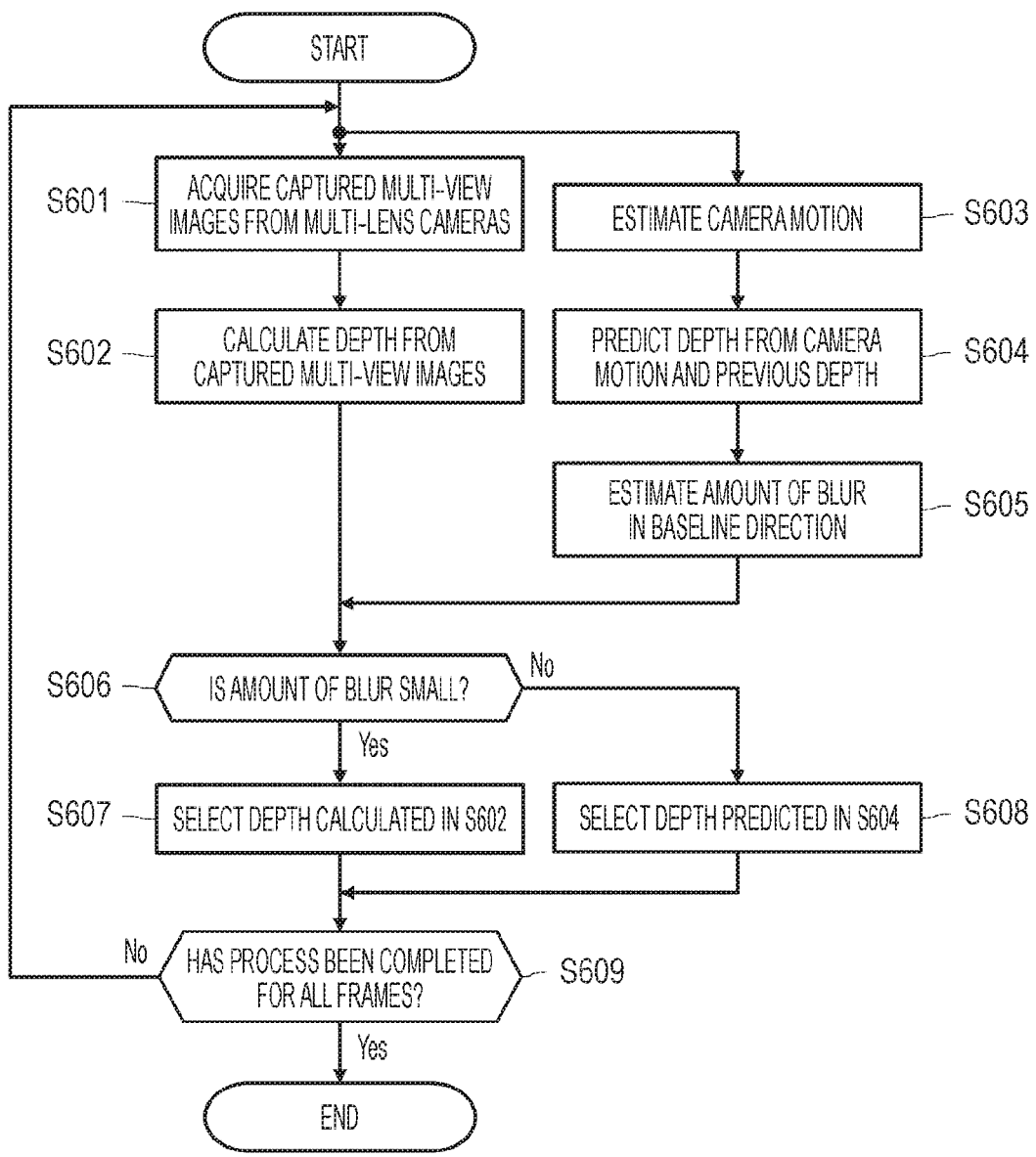
FIG. 6 is a flowchart (second example) illustrating a processing procedure for estimating depth from images captured by multi-lens cameras.

FIG. 6 illustrates, as a flowchart, a processing procedure performed by the signal processing apparatus 100 for estimating depth from images captured by multi-lens cameras in the second example.

The depth detection unit 101 acquires captured multi-view images captured by a plurality of cameras (step S601), and calculates depth from the captured multi-view images (step S602).

Furthermore, the camera motion estimation unit 102 estimates camera motion on the basis of, for example, a three-dimensional angular velocity and acceleration acquired from the IMU (step S603). Then, the depth prediction unit 103 predicts depth at the current time point on the basis of the camera motion estimated by the camera motion estimation unit 102 and depth obtained previously (for example, in the preceding frame) (step S604).

Furthermore, on the basis of whether or not the camera motion estimated by the camera motion estimation unit 102 is in the same direction as the baseline direction of the cameras (or on the basis of an angle formed between the estimated camera motion and the baseline direction of the cameras), the synthesis unit 104 estimates the amount of blur which occurs in images captured by the cameras in the direction vertical to the baseline between the cameras (step S605). In step S605, the amount of blur may be estimated by further considering previous depth information and information such as shutter time.

Then, the synthesis unit 104 checks whether or not the amount of blur in the direction vertical to the baseline between the cameras is small (or is less than or equal to a predetermined threshold (step S606).

Here, if the amount of blur in the direction vertical to the baseline between the cameras is small (Yes in step S606), the synthesis unit 104 selects the information regarding the present depth detected by the depth detection unit 101 in previous step S602 (Step S607). Alternatively, in step S607, the synthesis unit 104 may increase the ratio of the present depth information to synthesize the present depth information and the predicted depth information.

Furthermore, if the amount of blur in the direction vertical to the baseline between the cameras is large (No in step S606), the synthesis unit 104 selects the information regarding the depth predicted in previous step S604 by the depth prediction unit 103 on the basis of the camera motion estimated by the camera motion estimation unit 102 and the depth obtained previously (step S608). Alternatively, in step S207, the synthesis unit 104 may increase the ratio of the information regarding the depth predicted by the depth prediction unit 103 to synthesize the predicted depth information and the present depth information.

Then, if the depth estimation process described above has been completed for all frames captured by the multi-lens cameras (Yes in step S609), the process is ended.

EXAMPLE 3

In a third example, when a depth estimation process is performed on images captured by three or more cameras, two cameras with less motion blur are selected to perform the depth estimation process. Alternatively, two cameras with similar motion blur are selected from the three or more cameras to perform the depth estimation process.

Figure 7:
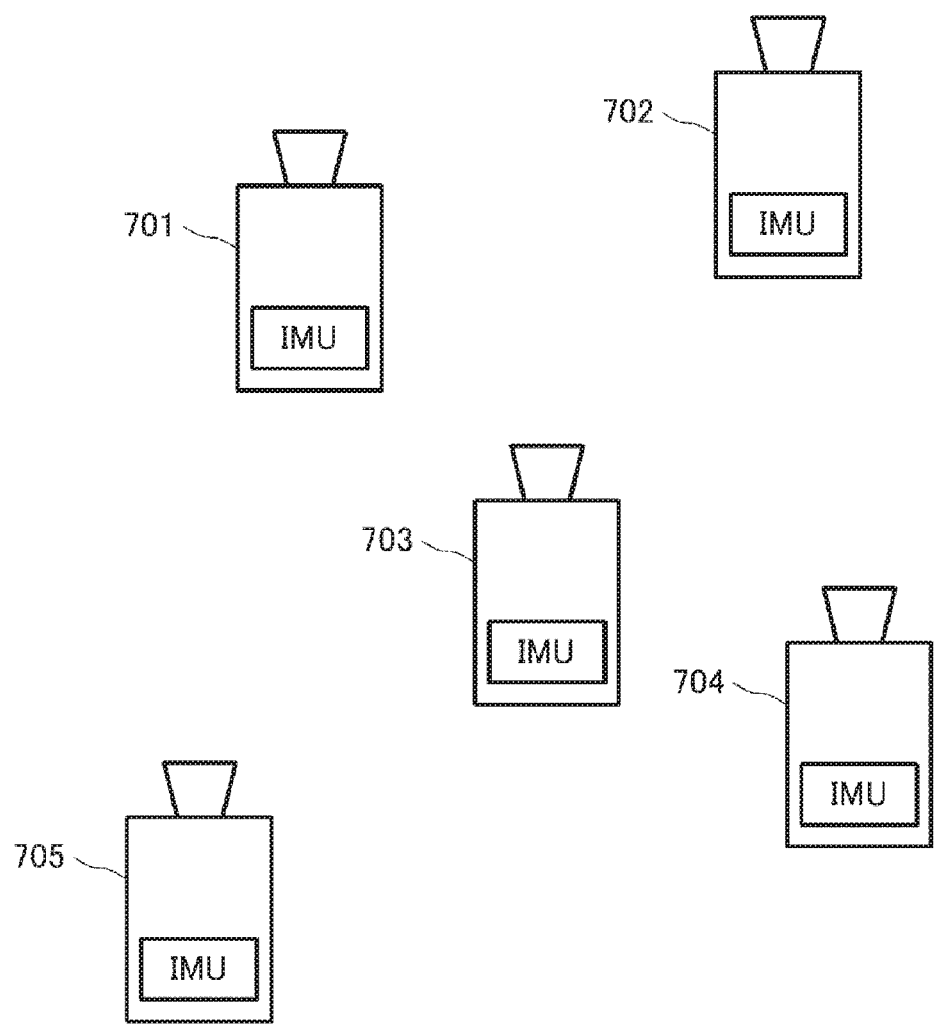
FIG. 7 is a diagram for explaining a method for selecting two cameras with less motion blur from three or more cameras.

For example, as illustrated in FIG. 7, when IMUs are mounted on respective cameras 701 to 705 to be used, camera motions each measured by one of the IMUs of the respective cameras 701 to 705 are compared with each other, and two cameras with less motion blur or two cameras with similar motion blur are selected to perform the depth estimation process.

Figure 8:
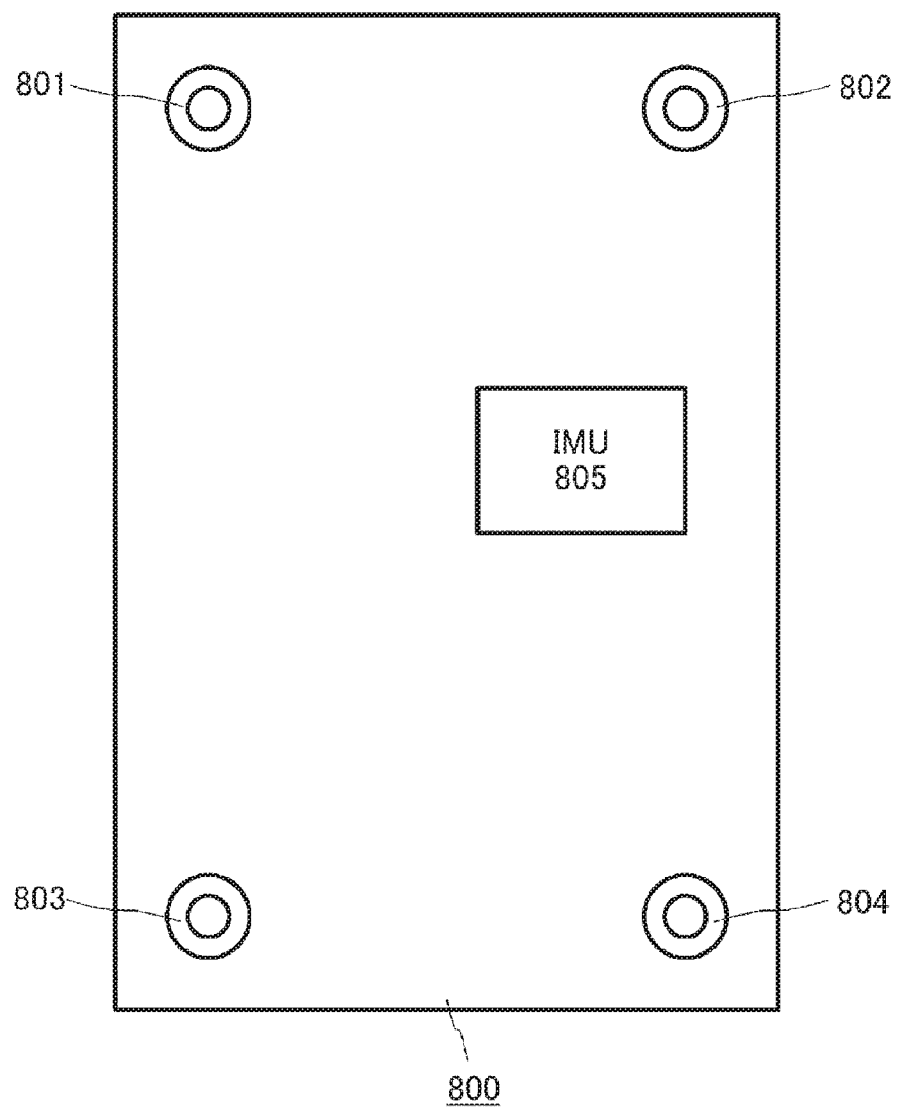
FIG. 8 is a diagram for explaining a method for selecting two cameras with less motion blur from three or more cameras.

Furthermore, when a plurality of cameras 801 to 804 and one IMU 805 are mounted on one information terminal 800 (for example, a smartphone or the like) as illustrated in FIG. 8, the motions of the respective cameras 801 to 804 are estimated by the one IMU 805, and two cameras with less motion blur or two cameras with similar motion blur are selected to perform the depth estimation process.

Figure 9:
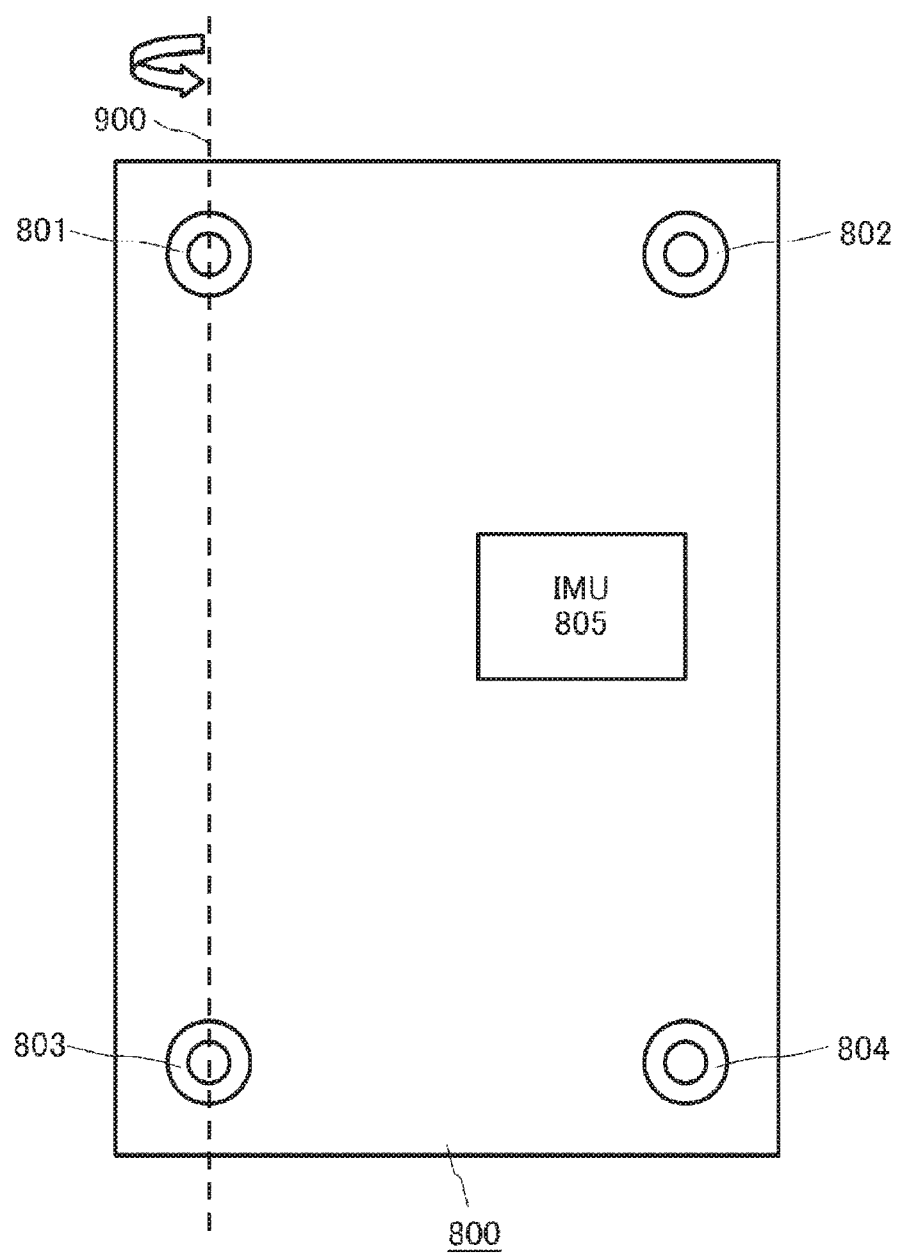
FIG. 9 is a diagram for explaining a method for selecting two cameras with less motion blur from three or more cameras.

For example, when the information terminal 800 rotates around a yaw axis 900 which connects optical axes of the camera 801 and the camera 803 as illustrated in FIG. 9 in the example configuration illustrated in FIG. 8, the camera 801 and the camera 803 have motion blur in the same yaw direction, while the other cameras 802 and 804 have motion blur in a translational direction in addition to the yaw direction. Accordingly, it can be said that it is preferable to select the camera 801 and the camera 803 to perform the depth estimation process.

Furthermore, when an optical image stabilizer (OIS) which performs a blur correction process in an optical system is mounted on each camera, a blur uncorrected thereby may be estimated, and cameras with similar uncorrected blur may be selected to perform the depth estimation process. Note that in the OIS, for example, a vibration sensor senses vibration during capturing to correct the position of a lens or adjust the position of an imaging element (image sensor), thereby suppressing an influence of camera shake.

Figure 10:
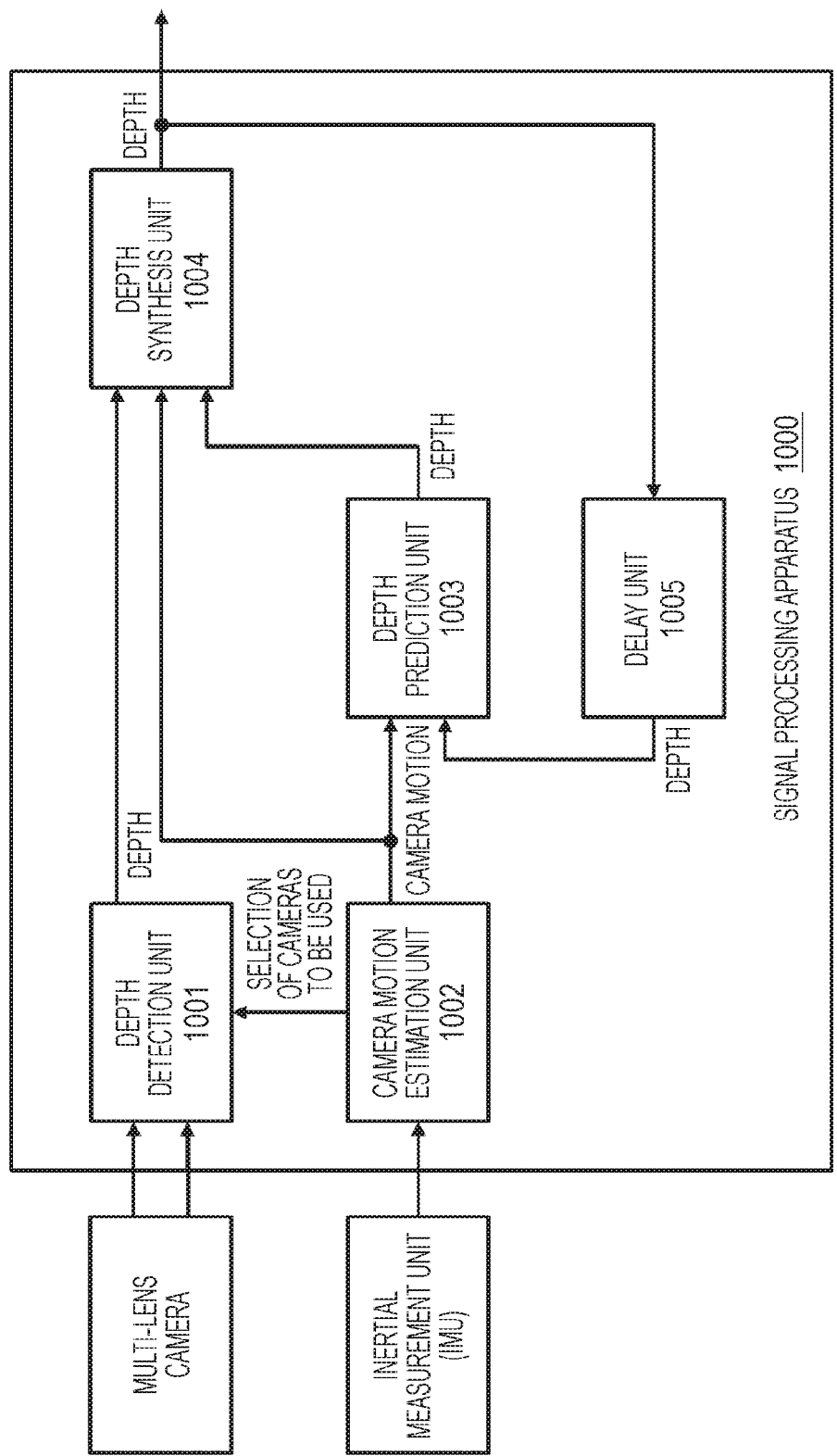
FIG. 10 is a diagram illustrating an example configuration of a signal processing apparatus 1000.

FIG. 10 schematically illustrates an example configuration of a signal processing apparatus 1000 according to the second example. The illustrated signal processing apparatus 1000 includes a depth detection unit 1001, a camera motion estimation unit 1002, a depth prediction unit 1003, a depth synthesis unit 1004, and a delay unit 1005.

The camera motion estimation unit 1002 estimates camera motion by detecting a camera position. Furthermore, the camera motion estimation unit 1002 selects, as cameras to be used for depth detection, two cameras with less motion blur or two cameras with similar motion blur from three or more cameras.

For example, when the IMUs are mounted on respective cameras to be used (see FIG. 7), the camera motion estimation unit 1002 compares camera motions each measured by one of the IMUs of the respective cameras and selects, as cameras to be used for depth detection, two cameras with less motion blur or two cameras with similar motion blur. Furthermore, when a plurality of cameras and one IMU are mounted on one information terminal (see FIG. 8), the camera motion estimation unit 1002 estimates the motions of the respective cameras from results of measurements performed by the one IMU and selects, as cameras to be used for depth detection, two cameras with less motion blur or two cameras with similar motion blur.

Furthermore, when the OIS is mounted on each camera, the camera motion estimation unit 1002 may estimate uncorrected blur of each camera, and may select, as cameras to be used for depth detection, cameras with similar uncorrected blur.

Then, the depth detection unit 1001 detects depth using the cameras selected by the camera motion estimation unit 1002 from the plurality of (three or more) cameras.

The depth prediction unit 1003 predicts depth at a current time point on the basis of the camera motion estimated by the camera motion estimation unit 1002 and previous depth (for example, depth of the preceding frame) stored in the delay unit 1005.

The synthesis unit 1004 estimates the amount of blur which occurs in each image captured by the cameras from the camera motion estimated by the camera motion estimation unit 1002, and synthesizes the depth at the current time point detected by the depth detection unit 1001 and depth obtained from the depth obtained by the depth prediction unit 1003 at a ratio based on the amount of blur. Alternatively, the synthesis unit 1004 selects and outputs either the depth at the current time point detected by the depth detection unit 1001 or the depth obtained from the depth obtained by the depth prediction unit 1003, on the basis of the amount of blur.

Figure 11:
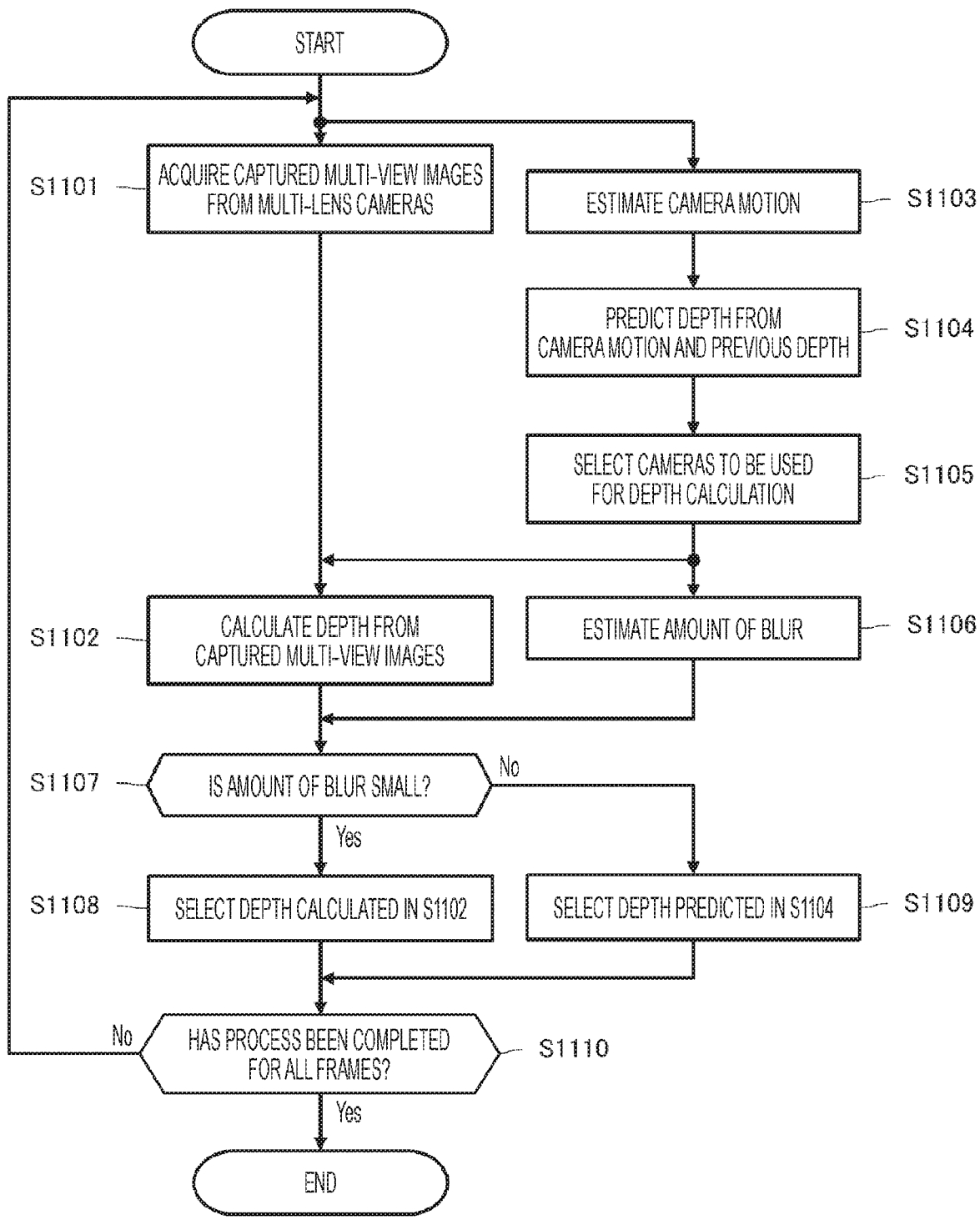
FIG. 11 is a flowchart (third example) illustrating a processing procedure for estimating depth from images captured by multi-lens cameras.

FIG. 11 illustrates, as a flowchart, a processing procedure for estimating depth from images captured by multi-lens cameras in the signal processing apparatus 1000 illustrated in FIG. 10.

The camera motion estimation unit 1002 estimates camera motion on the basis of, for example, a three-dimensional angular velocity and acceleration acquired from the IMU (step S1103). Then, the depth prediction unit 1003 predicts the depth at the current time point on the basis of the camera motion estimated by the camera motion estimation unit 1002 and depth obtained previously (for example, in the preceding frame) (step S1104).

Furthermore, the camera motion estimation unit 1002 selects, as cameras to be used for depth detection, two cameras with less motion blur or two cameras with similar motion blur from three or more cameras (step S1105).

On the other hand, when the depth detection unit 1001 acquires captured multi-view images captured by a plurality of cameras (step S1101), the depth detection unit 1001 calculates depth from the images captured by the respective cameras selected by the camera motion estimation unit 1002 (step S1102).

Next, the synthesis unit 1004 estimates the amount of blur which occurs in each image captured by the cameras from the motions of the respective cameras selected by the camera motion estimation unit 1002 in step S1105 (step S1106). In step S1106, the amount of blur may be estimated by further considering previous depth information and information such as shutter time.

Then, the synthesis unit 1004 checks whether or not the estimated amount of blur is small (or is less than or equal to a predetermined threshold (step S1107).

Here, if the amount of blur is small (Yes in step S1107), the synthesis unit 1004 selects the information regarding the present depth detected by the depth detection unit 1001 in previous step S1102 (step S1108). Alternatively, in step S1108, the synthesis unit 1004 may increase the ratio of the present depth information to synthesize the present depth information and the predicted depth information.

Furthermore, if the amount of blur is large (No in step S1107), the synthesis unit 1004 selects the information regarding the depth predicted in previous step S1104 by the depth prediction unit 1003 on the basis of the camera motion estimated by the camera motion estimation unit 1002 and the depth obtained previously (step S1109). Alternatively, in step S1109, the synthesis unit 1004 may increase the ratio of the information regarding the depth predicted by the depth prediction unit 1003 to synthesize the predicted depth information and the present depth information.

Then, if the depth estimation process described above has been completed for all frames captured by the multi-lens cameras (Yes in step S1110), the process is ended.

INDUSTRIAL APPLICABILITY

Hereinbefore, the technology disclosed herein has been described in detail with reference to the specific embodiments. However, it is obvious that those skilled in the art can make modifications and substitutions of the embodiments without departing from the gist of the technology disclosed herein.

The technology disclosed herein can be applied to a signal processing apparatus which processes a video signal of a multi-lens camera, and various types of information terminals which include a plurality of cameras mounted thereon.

In short, the technology disclosed herein has been described in a form of exemplification, and the contents of the present description should not be interpreted restrictively. In order to judge the gist of the technology disclosed herein, the claims should be taken into consideration.

Note that the technology disclosed herein may have the following configurations.

(1) A signal processing apparatus including:
a detection unit that detects depth from video captured by a plurality of cameras;
an estimation unit that estimates camera motion by detecting a camera position;
a prediction unit that predicts present depth from camera motion and depth obtained previously; and
a synthesis unit that synthesizes depth detected by the detection unit and depth predicted by the prediction unit on the basis of a result of estimating the amount of blur that occurs in each image captured by cameras from camera motion.

(2) The signal processing apparatus according to (1) described above,
in which when the amount of blur is small, the synthesis unit increases a ratio of depth detected by the detection unit to perform a synthesis or selection, and when the amount of blur is large, the synthesis unit increases a ratio of depth predicted by the prediction unit to perform a synthesis or selection.

(3) The signal processing apparatus according to (1) or (2) described above,
in which the estimation unit estimates camera motion on the basis of a measurement result of an inertial measurement unit.

(4) The signal processing apparatus according to (1) or (2) described above,
in which the estimation unit estimates camera motion from video captured by a camera on the basis of visual SLAM technology.

(5) The signal processing apparatus according to any one of (1) to (4) described above,
in which the detection unit detects depth by block matching between images captured by respective cameras.

(6) The signal processing apparatus according to any one of (1) to (5) described above,
in which the prediction unit performs a viewing transformation on depth previously output from the synthesis unit, and predicts present depth from a present camera position estimated by the estimation unit.

(7) The signal processing apparatus according to any one of (1) to (6) described above,
in which the estimation unit estimates motion of the plurality of cameras in a baseline direction, and
the synthesis unit performs the synthesis on the basis of a result of estimating the amount of blur that occurs in a direction vertical to a baseline.

(8) The signal processing apparatus according to any one of (1) to (7) described above,
in which the estimation unit selects cameras with less motion blur or cameras with similar motion blur from three or more cameras, and
the detection unit detects depth using images captured by the cameras selected by the estimation unit.

(9) The signal processing apparatus according to (8) described above,
in which the estimation unit selects cameras with less motion blur or cameras with similar motion blur on the basis of a measurement result of an inertial measurement unit mounted on each camera.

(10) The signal processing apparatus according to (8) described above, in which the estimation unit selects cameras to be used for depth detection on the basis of motion of each camera estimated from a measurement result of an inertial measurement unit mounted on an information terminal including the plurality of cameras mounted thereon.

(11) The signal processing apparatus according to any one of (1) to (7) described above, in which the estimation unit estimates a blur uncorrected by an optical image stabilizer (OIS) and selects cameras with similar uncorrected blur.

(12) A signal processing method including:
a detection step of detecting depth from video captured by a plurality of cameras;
an estimation step of estimating camera motion by detecting a camera position;
a prediction step of predicting present depth from camera motion and depth obtained previously; and
a synthesis step of synthesizing depth detected in the detection step and depth predicted by the prediction unit on the basis of a result of estimating the amount of blur that occurs in each image captured by cameras from camera motion.

(13) An imaging apparatus including:
a plurality of cameras;
a detection unit that detects depth from video captured by the plurality of cameras;
an estimation unit that estimates camera motion by detecting a camera position;
a prediction unit that predicts present depth from camera motion and depth obtained previously; and
a synthesis unit that synthesizes depth detected by the detection unit and depth predicted by the prediction unit on the basis of a result of estimating the amount of blur that occurs in each image captured by cameras from camera motion.

REFERENCE SIGNS LIST

100 Signal processing apparatus
101 Depth detection unit
102 Camera motion estimation unit
103 Depth prediction unit
104 Depth synthesis unit
105 Delay unit
1000 Signal processing apparatus
1001 Depth detection unit
1002 Camera motion estimation unit
1003 Depth prediction unit
1004 Depth synthesis unit
1005 Delay unit

The invention claimed is:

1. A signal processing apparatus, comprising:
circuitry configured to:
detect a first depth of a first frame of a first video captured by a plurality of cameras;
estimate a motion of a camera of the plurality of cameras by detection of position of the camera;
predict a present depth of the first frame based on the motion of the camera and a second depth of a second frame of the first video, wherein the second frame precedes the first frame; and
synthesize the first depth and the present depth based on a result of estimation of a first amount of blur that occurs in each image captured by the plurality of cameras, wherein the estimation of the first amount of blur is based on the motion of the camera.

2. The signal processing apparatus according to claim 1, wherein the circuitry is further configured to:
increase, based on the first amount of blur that is less than or equal to a threshold value, a ratio of the first depth to perform one of the synthesis or selection of information regarding the first depth; and
increase, based on the first amount of blur that is greater than the threshold value, a ratio of the present depth to perform one of the synthesis or selection of information regarding the present depth.

3. The signal processing apparatus according to claim 1, wherein the circuitry is further configured to estimate the motion of the camera based on a measurement result of an inertial measurement unit.

4. The signal processing apparatus according to claim 1, wherein
the circuitry is further configured to estimate the motion of the camera from a second video captured by the camera, and
the estimation of the motion is based on visual simultaneous localization and mapping (SLAM) technology.

5. The signal processing apparatus according to claim 1, wherein the circuitry is further configured to detect the first depth by block matching between images captured by respective cameras of the plurality of cameras.

6. The signal processing apparatus according to claim 1, wherein the circuitry is further configured to:
perform a viewing transformation on the second depth; and
predict, based on the viewing transformation, the present depth from the position of the camera.

7. The signal processing apparatus according to claim 1, wherein the circuitry is further configured to:
estimate a motion of the plurality of cameras in a baseline direction; and
perform the synthesis based on a second amount of blur that occurs in a direction vertical to the baseline direction.

8. The signal processing apparatus according to claim 1, wherein the circuitry is further configured to:
select one of a first set of cameras of the plurality of cameras with less motion blur than remaining cameras of the plurality of cameras or a second set of cameras of the plurality of cameras with similar motion blur; and
detect the first depth using images captured by the one of the first set of cameras or the second set of cameras.

9. The signal processing apparatus according to claim 8, wherein the circuitry is further configured to select the one of the first set of cameras or the second set of cameras based on a measurement result of an inertial measurement unit mounted on each camera of the plurality of cameras.

10. The signal processing apparatus according to claim 8, wherein
the circuitry is further configured to select the one of the first set of cameras or the second set of cameras based on a motion of each camera of the plurality of cameras estimated from a measurement result of an inertial measurement unit mounted on an information terminal, and
the plurality of cameras is mounted on the information terminal.

11. The signal processing apparatus according to claim 1, wherein the circuitry is further configured to:
estimate a blur uncorrected by an optical image stabilizer (OIS); and select a set of cameras of the plurality of cameras with similar uncorrected blur.

12. A signal processing method, comprising:

detecting a first depth of a first frame of a video captured by a plurality of cameras;

estimating a motion of a camera of the plurality of cameras by detecting a position of the camera;

predicting a present depth of the first frame based on the motion of the camera and a second depth of a second frame of the video, wherein the second frame precedes the first frame; and synthesizing the first depth and the present depth based on a result of estimating an amount of blur that occurs in each image captured by the plurality of cameras, wherein the estimation of the amount of blur is based on the motion of the camera.

13. An imaging apparatus, comprising:

a plurality of cameras; and circuitry configured to:

detect a first depth of a first frame of a video captured by the plurality of cameras;

estimate a motion of a camera of the plurality of cameras by detection of position of the camera;

predict a present depth of the first frame based on the motion of the camera and a second depth of a second frame of the video, wherein the second frame precedes the first frame; and synthesize the first depth and the present depth based on a result of estimation of an amount of blur that occurs in each image captured by the plurality of cameras, wherein the estimation of the amount of blur is based on the motion of the camera.

* * * * *